Aug. 20, 1968  H. C. BANAS  3,397,432

LATCH ASSEMBLY

Filed Jan. 6, 1967

INVENTOR.
HENRY C. BANAS
BY
-AGENT-

United States Patent Office 3,397,432
Patented Aug. 20, 1968

3,397,432
LATCH ASSEMBLY
Henry C. Banas, Costa Mesa, Calif., assignor, by mesne assignments, to McDonnell Douglas Corporation, Santa Monica, Calif., a corporation of Maryland
Filed Jan. 6, 1967, Ser. No. 607,823
1 Claim. (Cl. 24—201)

ABSTRACT OF THE DISCLOSURE

A latching apparatus incorporating two separate and spaced latching assemblies for retaining a latchable member therebetween, wherein each assembly includes a spring-biased arm pivotally mounted between a pair of upstanding members, the spring-biased arms being capable of cooperating to retain the latchable member beneath the upstanding member.

Background of the invention

The field of this invention is in the area of aircraft, more specifically this invention relates to a fastener which is to hold structure which is specifically designed for use in aircraft.

In the aircraft prior art it is common to employ an apparatus to evacuate passengers in the event of an emergency landing. One such apparatus is an inflatable slide which when actuated allows safe disembarkment of the passengers. An evacuation apparatus of this type is needed because present day aircraft are so large that in an emergency landing, the passenger doors may be several feet above the ground. It is also necessary to have the slide actuated in the shortest possible time as the aircraft may be on fire or other such an emergency situation which requires speed in the evacuation of the passengers.

Therefore, this invention is to be associated with an evacuation slide located in aircraft. The slide is retained in an uninflated condition within a container mounted on the interior side of each passenger door. Usually, more than one passenger door is located within each aircraft and each is to include a slide assembly. It is desirable to actuate the slide upon the single movement of the opening of the door. For this purpose, a latch of this invention is employed.

Heretofore, the latches which have been used to hold the apparatus of the evacuation slide have not been designed to facilitate ease of operation. The latching apparatus of the prior art usually requires a substantial force to affect the latching operation and likewise the substantial force to affect the unlatching operation. In the aircraft it is usually the stewardess who accomplishes the operation of the latching apparatus. As the strength of the stewardess is not great, it is desirable to construct a latch which can be operated with a minimum of effort yet maintain a substantial locking force.

Summary

Specifically a pair of latches of this invention are to be mounted in a spaced in line relationship on the floor of the aircraft, a bar member to be held therebetween. The bar member is attached to a portion of the inflatable slide which protrudes from the slide container. Upon opening of the door the retained bar causes removal of the evacuation slide, the slide then being inflated and functioning to allow safe passenger evacuation. Each latch includes a pivotable arm which is spring biased to a latched position. Means is provided to rotate the arm to an unlatched position. When in the latched position the pivotable arm prevents movement of an end portion of the retained bar. The intended use of this invention should in no way limit this invention as any use is conceivable within the scope of this invention where it is desirable to employ a latch of such an operation and function. It is felt to be obvious that one object of this invention is a latch of simple construction which securely retains a bar member and prevents accidental release. Another object of this invention is to provide a latch which facilitates ease of the latching and unlatching operation.

Description of the shown embodiment

Figure 1:
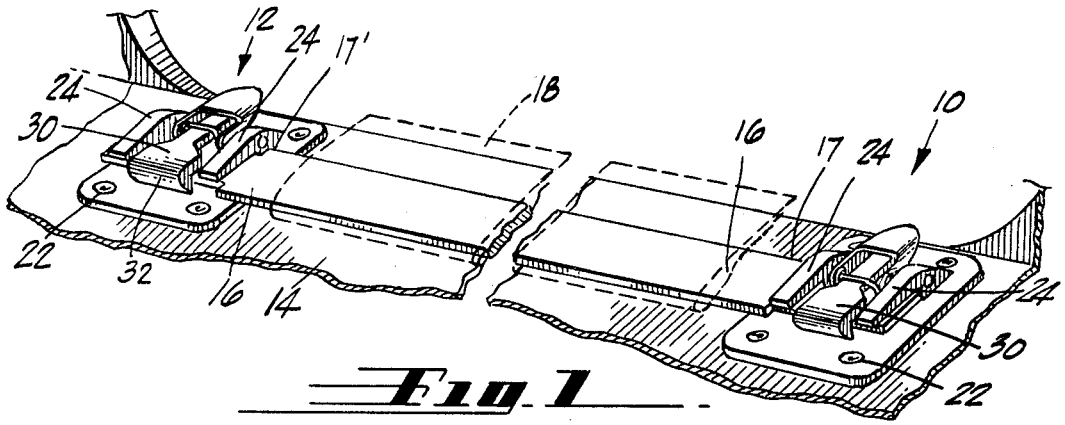
FIGURE 1 is a pictorial view of a pair of the latches of this invention shown as installed adjacent a door of an aircraft.

As shown in FIG. 1, a right hand latch 10 and a left hand latch 12 are mounted to the floor 14 of an aircraft. Each of the latches 10 and 12 are identical in construction and can be used as either the right or left hand latch. A bar 16 is retained between the latches 10 and 12, bar 16 being connected to an end portion 18 of the evacuation slide. The evacuation slide (not shown) is to be mounted on the aircraft door. It is apparent that from the drawing that both latches 10 and 12 are required to retain the bar 16. A single latch in itself being insufficient. Bar 16 is formed at each end with shoulders 17 and 17¹. Function of 17 and 17¹ will be explained further in the specification.

Figure 2:
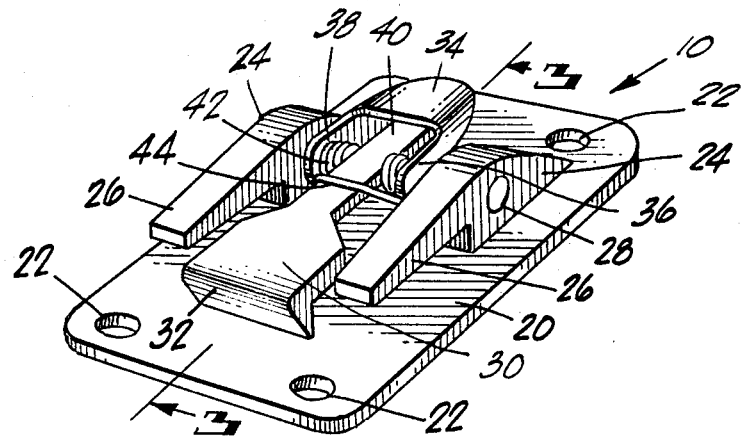
FIG. 2 is a perspective view of one of the latches shown in FIG. 1.
Figure 3:
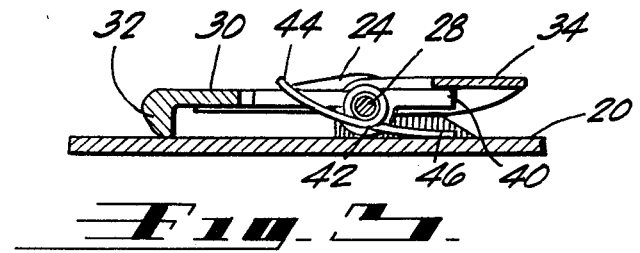
FIG. 3 is a sectional side view taken along line 3—3 of the latch shown in FIG. 2.

Referring now specifically to FIG. 2, the latch 10 will be described in detail. The latch 10 includes a base plate 20 which includes apertures 22 to facilitate the fastening of the base plate 20 to the floor of the aircraft 14. Fixedly secured to the top side of the base plate 20 are two symmetrically placed apart abutment members 24. Each of the members 24 includes an extending flange portion 26 which is vertically spaced from the base plate 20. This spacing coupled with the depth of the flange 26 is sufficient to allow the insertion of an end portion of the bar 16.

Centrally held between the abutment members 24 by means of the pivot pin 28 is the arm member 30. Arm member 30 has at its front end a depending flange 32 which is to contact the base plate 20. The length of the flange 32 is sufficient so the space between the body of the arm 30 and the base plate 20 is equal to the space between the extending flange 26 and the base plate 20 of the abutments 24. It is apparent that the end of the bar 16 is capable of being held against transverse movement when positioned between the depending flange 32 of the arm 30 and the front portion of the fixed abutments 24.

Coaxially mounted on the pivot pin 28 with the arm 30 is a U-shaped operating plate 34. Each of the legs 36 and 38 of the operating plate 34 are pivotally held on the pivot pin 28. The arm 30 is held by the pivot pin 28 between the legs 36 and 38. The back end 40 of the arm 30 is spaced a predetermined distance from the pivot 28. The operating plate 34 is so designed as to contact the back end 40 of the arm 30 and rest upon it by gravity. A spring 42 is coiled about the pivot pin 28 and has spaced coils located on either side of the arm 30, between the legs 36 and 38 of the operating plate 34. Each of the coils of the spring 42 are connected through a connecting link 44 which passes over the top of the arm 30. The unattached extremities 46 of the spring 42 extend toward the back portion of the latch 10 and merely rest on the base 20. As is readily seen from the drawing the spring 42 operates between the base plate 20 and the arm 30, biasing the arm 30 in a contactual relationship with the base plate 20. This represents the latched position of each latch of this invention.

To effect movement of the arm 30 from the latched position, it is only necessary to manually exert a downward force upon the operating plate 34. Because the end 40 of the arm 30 is associated with the operating plate 34, the arm 30 is rotated against the action of the spring bias. Thereupon, the extending flange 32 is moved out of contactual relationship with the base plate 20 and displaced vertically a spaced amount above the base plate 20. In this manner, the retained end of the bar 16 can be moved out of association with the latch 10.

The shoulders 17 and $17^1$ of the bar 16 are necessary to affect the positive retention of the bar 16 by the latches 10 and 12. The latches 10 and 12 are mounted on the floor of the aircraft 14 spaced apart sufficiently so as to allow shoulder 17 to abut the nearest abutment 24 of latch 10 and the shoulder $17^1$ to abut the nearest abutment 24 of the latch 12. Such an arrangement limits the longitudinal movement of the bar 16 when the bar is in the latched position of the latches 10 and 12.

From the foregoing the operation of the latch of this invention is felt to be obvious. However, to complete the explanation of the invention, the latching procedure will now be described. With both latches 10 and 12 being correctly positioned on the aircraft floor 14 each end of the bar 16 is placed adjacent the depending flange 32 of each latch 10 and 12. The forward end of the depending flange 32 is beveled in such a manner as that when the end of the bar 16 is forcibly moved against it, it tends to cause the arm 30 to move upwardly and permit passage thereunder of the portion of the arm 16. Each end of the arm 16 is moved until it contacts the forward end of the abutments 24. In this position the depending flange 32 will again contact the base plate 20 and prevent withdrawal of its respective portion of the bar 16. In this manner, the bar 16 is securely retained and ready to effect employment of the evacuation slide 18 upon the movement of opening the door. If it is desirable to disengage the bar 16 manually from the latches 10 and 12, as use of the slide 18 was not necessary, the operator merely forcibly moves the operating plate 34 of each latch 10 and 12 until each end portion of the bar 16 can be withdrawn from the latch assembly.

It is to be appreciated that the invention has been described in connection with a specific embodiment, and that variations in the structure may be made without departing from the spirit and scope of the invention, the true scope of the invention is to be measured only by a just interpretation of the following claim.

I claim:
1. A latch assembly comprising:
two separate and spaced apart substantially planar base plates being positioned in a single plane, each of said base plates having a pair of spaced upstanding members fixedly secured thereto;
an arm being pivotally mounted in each of the spaces between each of said upstanding members, the plane of each of said arms pivotal movement being substantially at right angles to the said single plane of said base plates, the body of each of said arms being substantially in parallel alignment to the said single plane of said base plates, an end of each of said arms having a depending flange which is to be contactable with its respective base plate and normally biased to be in contact with its respective base plate;
a latchable member capable of being retained between said spaced apart base plates, the end portions of said latchable member being positionable between a portion of each of said upstanding members and its respective base plate, said depending flange retaining said latchable member and preventing its removal from between said upstanding members and the base plates; and
operating means located between each of said pair of upstanding members and being capable upon manual actuation of pivoting each of said arms against the bias of said arms.

References Cited

UNITED STATES PATENTS

| 356,741 | 2/1887 | Beckman | 248—262 |
|---|---|---|---|
| 2,669,494 | 2/1954 | Lenz. | |
| 2,689,607 | 9/1954 | Loucony | 248—267 X |
| 3,270,388 | 9/1966 | Humphrey. | |

FOREIGN PATENTS 30,900   4/1885   Germany.

BERNARD A. GELAK, *Primary Examiner.*